No. 671,085. Patented Apr. 2, 1901.
P. W. KNOWLES.
ENDLESS HARVESTER SICKLE.
(Application filed June 6, 1900.)
(No Model.) 2 Sheets—Sheet 1.
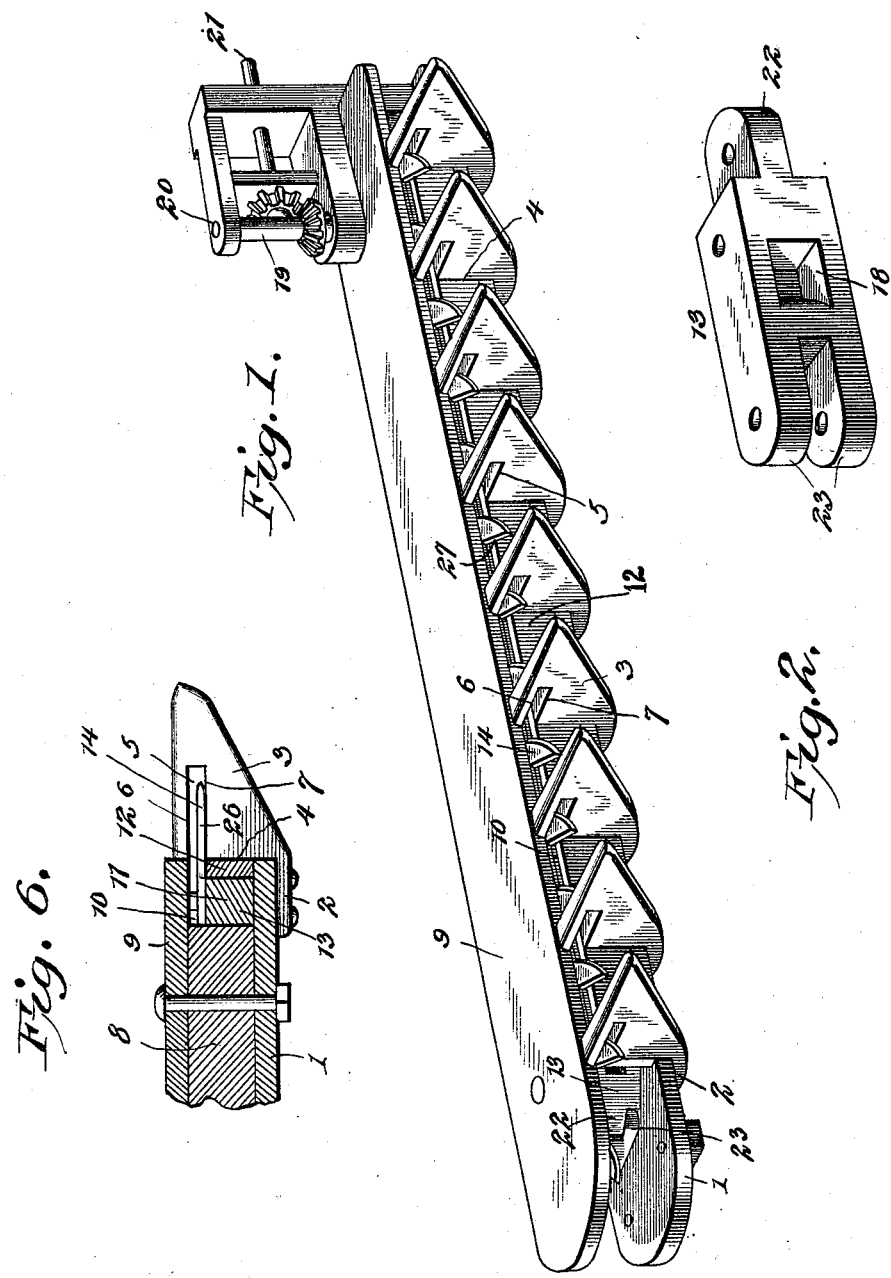

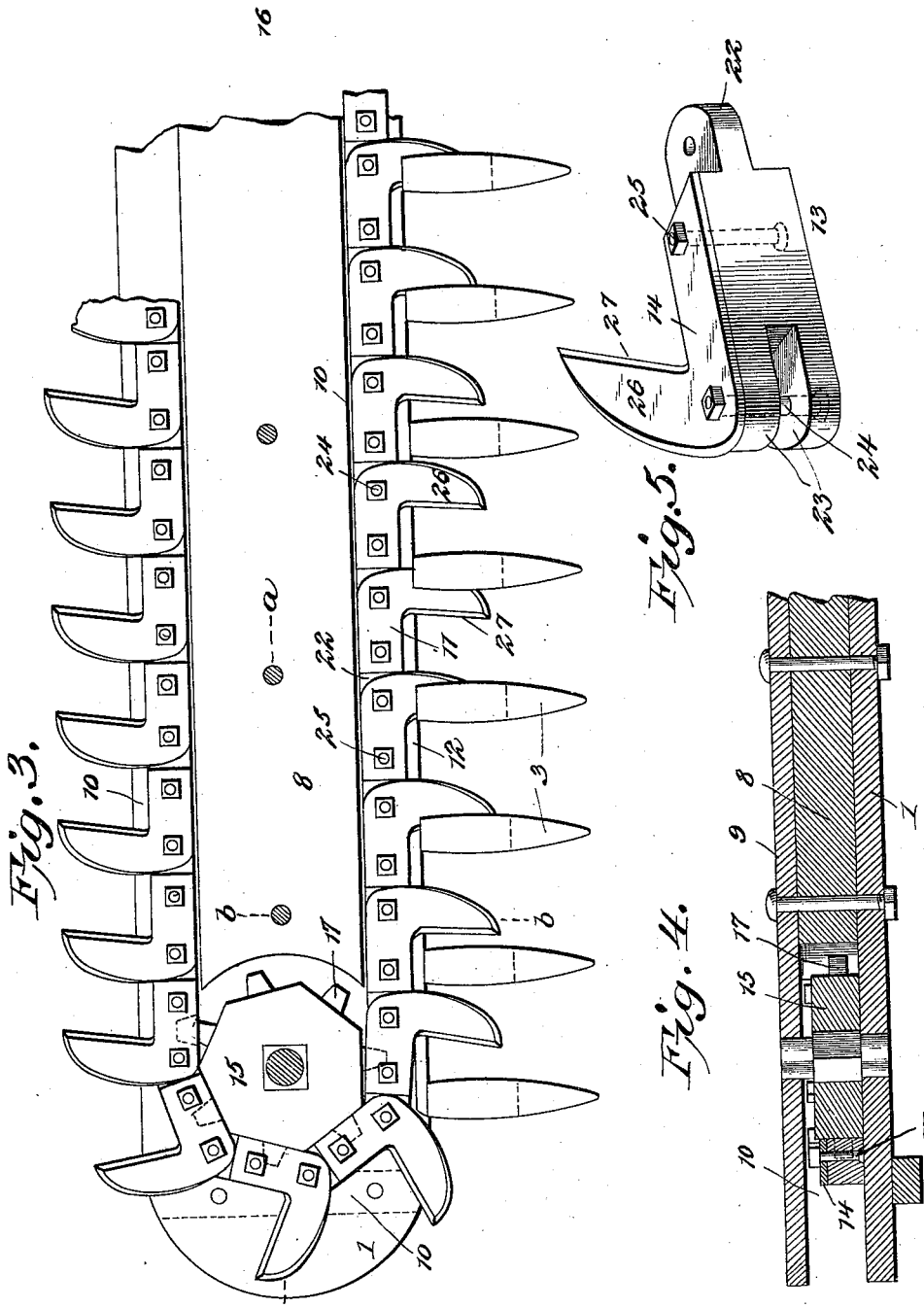

UNITED STATES PATENT OFFICE.

PHILIP W. KNOWLES, OF DUFUR, OREGON.

ENDLESS HARVESTER-SICKLE.

SPECIFICATION forming part of Letters Patent No. 671,085, dated April 2, 1901.

Application filed June 6, 1900. Serial No. 19,285. (No model.)

*To all whom it may concern:*

Be it known that I, PHILIP W. KNOWLES, a citizen of the United States, residing at Dufur, in the county of Wasco and State of Oregon, have invented a new and useful Endless Harvesting-Sickle, of which the following is a specification.

My invention is an improved endless cutting apparatus for harvesters, mowing-machines, and the like, one object of my invention being to provide improved coacting finger-bars and an endless traveling cutter which are adapted to effect a shear cut on the grain or grass and to compress the same against the front side of the cutter-bar while in the act of cutting the same, thereby increasing the efficiency of the cutting apparatus.

A further object of my invention is to provide an improved form of endless cutting-chain in which the cutter-plates are separable from the links thereof and in which the latter are provided with coacting recesses adapted to be engaged by the teeth of the actuating and supporting sprocket-wheels.

A further object of my invention is to provide an improved form of cutter-bar in connection with the finger-bars and endless cutting-chains.

My invention consists in the peculiar construction and combination of devices hereinafter fully set forth, and pointed out in the claims.

In the accompanying drawings, Figure 1 is a perspective view of an endless cutting apparatus embodying my improvements. Fig. 2 is a detail perspective view of one of the links of the endless traveling cutting-chain. Fig. 3 is a top plan view, partly in section, of my improved cutting apparatus. Fig. 4 is a detail sectional view of the same, taken on the line *a a* of Fig. 3. Fig. 5 is a detail perspective view of a link of the endless traveling cutting-chain and the cutting-plate attached thereto. Fig. 6 is a transverse sectional view taken on the line *b b* of Fig. 3.

In the embodiment of my invention I employ a base-plate 1, which is of suitable length and breadth and to the under side of which are bolted the rearward-extending arms 2 of the fingers 3, vertical shoulders 4 being formed at the rear sides of the fingers and horizontally-disposed slots 5 being made in the said fingers, whereby coacting cutting edges 6 7 are formed at the upper and lower sides of said slots. A space-block 8 of suitable length, breadth, and thickness is secured on the base-plate 1, and on the upper side of the said space-block is secured a top plate 9, which corresponds with the base-plate in size and shape. It will be observed by reference to the drawings that a runway 10 is formed between the base and top plates on the front and rear sides of the cutting apparatus and at the ends thereof, in which runway an endless cutting-chain 11 is adapted to travel, as hereinafter described. A plate 12, secured on the rear side of the shoulders 4 of the fingers 3, extends from the base-plate to the level of the lower sides of the slots 5 in said fingers. The endless traveling chain 11 comprises a series of separable links 13 and cutter-plates 14, which are secured thereon. The front lead of the endless traveling chain operates immediately in rear of the plate 12, and the cutter-plates 14, which are secured on the links 13, project forward over said plate 12 and operate in the slots 5 of fingers 3, coöperating with the lower edges 7 of said slots to cut the grass or grain, as will be understood. The endless traveling cutting-chain passes over the sprocket-wheels 15 at opposite ends of the base and top plates. One of said wheels is shown in Figs. 3 and 4. The other is on the shaft 19, which is shown in Fig. 1, and is hidden by the top plate, the said sprocket-wheels being of polygonal form, adapted to the links 13 of the endless chain and provided with projecting spurs 17, which engage openings 18, made in the inner sides of the links 13. The shaft 19 of wheel (not shown) at the inner end of the cutting apparatus is provided in the embodiment of my invention here shown with a vertical extension 20, to which a power-shaft 21 is geared; but I do not limit myself to this construction and combination of devices, as any suitable means may be employed for driving the endless cutting-chain.

Each link 13 is provided at one end with a projecting lug 22, adapted to fit between a pair of lugs 23 at the opposing end of the next link, and bolts 24 are employed which pass through alined openings in the lugs 22 24, and hence serve to flexibly connect the said links together throughout the series. The said bolts 24 also pass through the cutting-plates 14, at one end thereof, and in connection with the bolts 25 serve to secure said cutting-plates on the upper sides of said links 13. Each cutting-plate has a forward-extending obliquely-disposed cutting-arm 26, provided with a cutting edge 27. Said cutting edges 27 are obliquely disposed with reference to the coacting edge 7 of the fingers 3 and diverge from the same rearwardly, as shown in Figs. 1 and 3, and this oblique disposition and arrangement of the cutting edges of the cutting-plates and fingers is effective in causing the same to cut by a shearing action and in operation gathers the grass or grain in bunches between the opposing sides of the fingers and the cutting-plates and presses said bunches of grass or grain rearwardly against the plate 12 at the bases of the fingers in the act of cutting the same, thereby greatly enhancing the efficiency of the cutting apparatus and causing the same to cut the grain or grass by clean shear cuts, thus avoiding the entanglement of the grain or grass while cutting the same, preventing the grain or grass from binding in the cutting mechanism, and leaving the stubble clear.

I am aware that it is not broadly new to combine an endless cutter with fingers which coact therewith, and this I disclaim.

Having thus described my invention, I claim—

1. In endless cutting apparatus for harvesters and the like, the combination with fingers, of an endless traveling chain having cutting-plates coacting with said fingers, said cutting-plates having obliquely-disposed cutting edges diverging rearward from the coacting edges of said fingers, for the purpose set forth, substantially as described.

2. In endless cutting apparatus for harvesters and the like, an endless traveling chain composed of links having projecting lugs at one end, bolts extending through alined openings in said lugs, and flexibly connecting said links together, and cutter-plates secured on said links, said cutter-plates having the obliquely-disposed cutting-blades, in combination with a frame having coacting fingers provided with slots in which the cutting-blades operate, the cutting edges of the blades or arms of said cutter-plates diverging rearwardly from the coacting edges of said fingers, substantially as described.

3. In endless cutting apparatus for harvesters, the combination of the base and top plates, forming a runway between them, the forward-projecting fingers having slots, the rearward-extended arms on their lower sides bolted to the lower side of said base-plate and the vertical shoulders 4, the plate 12 secured on the rear sides of the fingers, closing the spaces between the bases thereof and extending from the base-plate to the slots of said fingers, the sprocket-wheels mounted between the base and top plates, the endless chain disposed in the said runway and connecting the said sprocket-wheels, said chain having its front surface bearing against the rear side of plate 12, and the cutting-plates on said endless chain having cutting edges coacting with the edges of said fingers and operating in the slots of the latter, substantially as described.

In testimony that I claim the foregoing as my own I have hereto affixed my signature in the presence of two witnesses.

PHILIP W. KNOWLES.

Witnesses:
DOLPH L. HOLGATE,
GEO. W. JOHNSTON.